United States Patent
Whitt et al.

(10) Patent No.: US 9,149,801 B2
(45) Date of Patent: Oct. 6, 2015

(54) METHOD AND SYSTEM FOR ADAPTING A CLEAN FILTER CORRECTION MAP FOR A SELECTIVE CATALYST REDUCTION FILTER

(71) Applicant: GM GLOBAL TECHNOLOGY OPERATIONS LLC, Detroit, MI (US)

(72) Inventors: Christopher Whitt, Howell, MI (US); Thomas Larose, Jr., Howell, MI (US); Christopher C. Swoish, Lapeer, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 13/919,040

(22) Filed: Jun. 17, 2013

(65) Prior Publication Data
US 2014/0371054 A1 Dec. 18, 2014

(51) Int. Cl.
- *B01D 46/00* (2006.01)
- *B01J 38/00* (2006.01)
- *B01J 38/12* (2006.01)
- *B01D 53/94* (2006.01)

(52) U.S. Cl.
CPC ............ *B01J 38/00* (2013.01); *B01D 53/94* (2013.01); *B01J 38/12* (2013.01)

(58) Field of Classification Search
CPC ......... Y02T 10/47; Y02T 10/20; F01N 9/002; F01N 2550/04; F01N 2900/1606; F02D 41/029; F02D 2200/0812
See application file for complete search history.

(56) References Cited

U.S. PATENT DOCUMENTS 7,758,676 B2   7/2010   Mital et al.

*Primary Examiner* — Amber Orlando
(74) *Attorney, Agent, or Firm* — Quinn Law Group, PLLC

(57) ABSTRACT

A system and method for adapting the clean filter correction map for a selective catalyst reduction filter SCRF of an exhaust gas aftertreatment system are provided. The system may be in fluid communication with an engine of a vehicle. The system may include a first pressure sensor and a second pressure. A differential pressure module is in communication with the first pressure sensor and the second pressure sensor and configured to generate a delta pressure signal corresponding to a pressure drop between the first pressure sensor and the second pressure sensor. The system may also include a controller configured to determine a number of completed regeneration events of the SCRF; compare the number of completed regeneration events to an evaluation element; and enable an adaptation module by executing one of a first control action, a second control action, and a third control action.

11 Claims, 1 Drawing Sheet

US 9,149,801 B2

METHOD AND SYSTEM FOR ADAPTING A CLEAN FILTER CORRECTION MAP FOR A SELECTIVE CATALYST REDUCTION FILTER

TECHNICAL FIELD

The present invention is drawn to a system and method for adapting the clean filter correction map for a Selective Catalyst Reduction Filter (SCRF) of an exhaust gas aftertreatment system.

BACKGROUND

Various exhaust aftertreatment devices, such as particulate filters and other devices, have been developed to effectively limit exhaust emissions from internal combustion engines. In the case of compression-ignition or diesel engines, a great deal of effort continues to be expended to develop practical and efficient devices and methods to reduce emissions of largely carbonaceous particulates otherwise present in the engine's exhaust gas.

An exhaust gas aftertreatment system for a modern diesel engine exhaust system typically incorporates a selective-catalytic-reduction device (SCR) and a Diesel Particulate Filter (DPF).

The SCR device is utilized to reduce NOx gases before the exhaust is discharged out a tailpipe. The SCR device uses a reductant capable of reacting with NOx gases to convert the NOx gases into inert byproducts, i.e., nitrogen and water. For example, the reductant can be an aqueous solution of urea, which is injected into the engine's exhaust stream. Once the reductant is in the exhaust stream, the reductant is absorbed into a catalyst of the SCR device, where the catalytic action of the SCR device ultimately converts NOx gases into the inert byproducts.

The DPF is utilized for collecting and disposing of the sooty particulate matter, emitted by the diesel engine, from the exhaust gas stream. A typical DPF acts as a trap for removing the particulate matter from the exhaust stream. The DPF may contain precious metals, such as platinum and/or palladium, which serve as catalysts to further oxidize soot and hydrocarbons present in the exhaust stream. In many instances, the DPF may be regenerated or cleaned using superheated exhaust gas to burn off the collected particulate.

Generally, the DPF is disposed downstream of the SCR device. In other words, the SCR device is spaced from the DPF such that the SCR device and the DPF are separate and independent components.

SUMMARY

A system and method for adapting the clean filter correction map for a Selective Catalyst Reduction Filter (SCRF) of an exhaust gas aftertreatment system is provided. The system may be in fluid communication with a soot producing engine of a vehicle. The system may include a first pressure sensor at an inlet side of the SCRF between the SCRF and the engine and a second pressure disposed at an outlet side of the SCRF. A differential pressure module is in communication with the first pressure sensor and the second pressure sensor and configured to generate a delta pressure signal corresponding to a pressure drop between the first pressure sensor and the second pressure sensor. The system may further include a controller to execute the present method of adapting the clean filter correction map for an SCRF.

The controller may be configured to execute the present method by performing the following method steps. The controller will first determine a number of completed regeneration events of the SCRF. The controller will then compare the number of completed regeneration events to an evaluation element, wherein the evaluation element is a predetermined discrete number of regeneration events. Finally, the controller will enable an adaptation module by executing one of a first control action, when the number of completed regeneration events is less than the evaluation element; a second control action, when the number of completed regeneration events is equal to the evaluation element; and a third control action, when the number of completed regeneration events is greater than the evaluation element.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
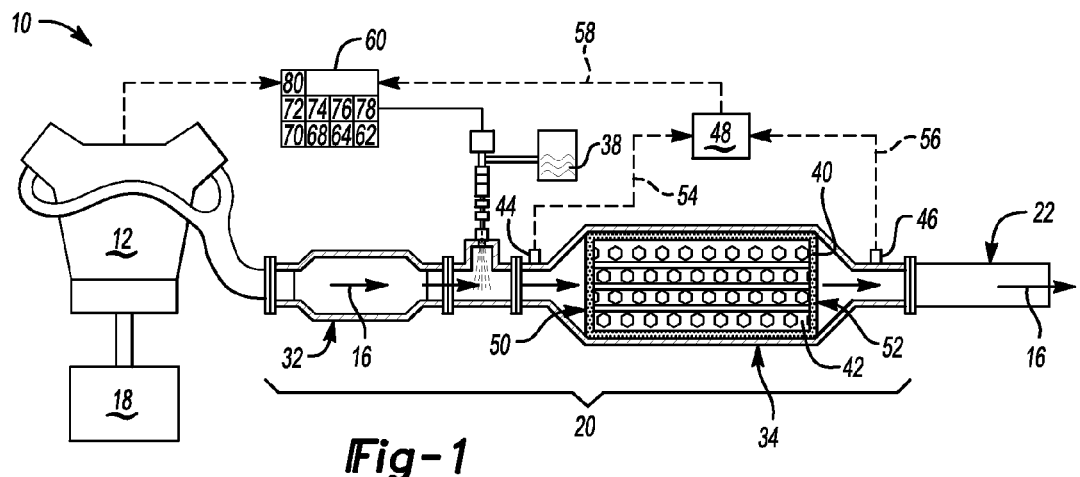
FIG. 1 is a schematic illustration of a vehicle with an engine connected to an exhaust gas aftertreatment system having an SCRF.

Referring to the drawings, wherein like reference numerals refer to like components throughout the several views, FIG. 1 schematically depicts a vehicle 10. The vehicle 10 includes an internal combustion engine 12, e.g., a diesel engine or any other soot producing engine that emits significant levels of nitrogen oxide (NOx) gasses and which generates an exhaust stream 16. While a diesel application is described hereinafter for illustrative consistency, those of ordinary skill in the art will appreciate that a similar approach may be taken with respect to other engine designs.

The vehicle 10 includes an exhaust gas aftertreatment system 20 for treating constituents in the exhaust gas such as NOx gases. In other words, the exhaust gas aftertreatment system 20 treats noxious emissions contained in the exhaust stream 16 expelled from the engine 12.

As shown in FIG. 1, aboard the vehicle 10, combustion of diesel fuel drawn from a fuel storage tank 18 generates the exhaust stream (arrow 16), which is then processed through the exhaust gas aftertreatment system 20 before being ultimately discharged from a tailpipe 22. The exhaust stream 16 is emitted from the engine 12 as a by-product of combustion, and is removed to the ambient through the exhaust gas aftertreatment system 20. The exhaust gas aftertreatment system 20 may include a series of exhaust after-treatment devices, shown as a diesel oxidation catalyst (DOC) 32 and selective catalyst reduction filter 34 (SCRF).

Accordingly, the exhaust gas aftertreatment system 20 includes a passage for directing the exhaust gas stream 16 from the engine 12 through the series of exhaust gas aftertreatment devices 32, 34. Depending on the embodiment, the after-treatment devices 32, 34 of the exhaust system 20 may be arranged in any desired order. Collectively, the oxidation catalyst 32 and the SCRF 34 provide the necessary conditioning of the exhaust stream (arrow 16).

The exhaust after-treatment devices 32, 34 are employed to reduce various exhaust emissions of the engine 12. In particular, the diesel oxidation catalyst 32 is adapted to receive the exhaust gas stream 16 from the engine 12 to oxidize and burn hydrocarbon emissions present in the exhaust steam 16, as it exits the engine 12. The diesel oxidation catalyst 32 is in communication with a fuel injection device (not shown) that delivers a calibrated amount of fuel into the oxidation catalyst 32. Ignition of the injected fuel rapidly increases the temperature of the exhaust stream 16, typically 600° C. or more, in order to enable a thermal regeneration of the SCRF 34. In-situ thermal regeneration of the SCRF 34 can be conducted periodically to burn off accumulated particulate matter or soot.

In one example, shown in FIG. 1, following the diesel oxidation catalyst 32, the exhaust gas stream 16 is routed to the SCRF 34. In other words, the SCRF 34 is disposed downstream to the DOC 32. The SCRF 34 is employed for 1) treating noxious emissions contained in an exhaust stream 16 of the engine 12; and 2) filtering particulate matter, i.e. soot, from the exhaust stream 16. Simply stated, SCRF 34 is utilized to reduce NOx emissions and particulate matter expelled from the engine 12 powering the vehicle 10.

The SCRF 34 includes an active catalytic component, which can be an oxide of a base metal such as one of vanadium, molybdenum, tungsten, and zeolite. A reductant 38 is utilized to convert NOx gases into inert byproducts. As such, the SCRF 34 converts NOx gases with the aid of the catalyst into inert byproducts, i.e., diatomic nitrogen $N_2$, and water $H_2O$. The reductant 38 can be an anhydrous ammonia, aqueous ammonia, ammonia precursors, aqueous solution of urea or any other suitable reductant 38, which is added to the exhaust stream (shown at arrow 16) and absorbed in the SCRF 34. Exhaust emissions of both gasoline engines and diesel engines can be improved by utilizing the SCRF 34. For the diesel engine embodiment, a general term "diesel-exhaust-fluid" or DEF is used to describe a reductant 38 that is employed by SCRF 34. Accordingly, the DEF accesses the SCRF 34 as the exhaust gas stream 16 flows through SCRF 34.

The SCRF 34 can include a carrier or substrate 42 that is dipped into a washcoat 40 containing the active catalytic component, i.e., the catalyst. The reductant 38 is utilized to convert NOx gases into inert byproducts. Specifically, the washcoat 40, utilized to absorb the reductant 38, is applied to or coated on the surface of the porous substrate and ultimately settles or is placed within the pores of the substrate 42. The substrate 42 can be a ceramic brick or a ceramic honeycomb structure, a plate structure, or any other suitable structure having a high porosity. In other words, the washcoat 40 can be applied to an inner surface of the substrate 42. The washcoat 40 attracts the reductant 38 to deposit the reductant 38 in the SCRF 34. In other words, the reductant 38 is disposed on the washcoat 40 inside the SCRF 34. As the exhaust stream 16 passes through the SCRF 34, the reducant 38 interacts with the exhaust gas stream 16 via a chemical reaction, to reduce NOx gases present in the exhaust gas stream 16 as it passes through the exhaust gas aftertreatment system 20.

The operating efficiency of the SCRF 34 can be determined by the effectiveness of the catalyst in reducing NOx emissions. For example, the washcoat 40 is a factor which contributes to the operating efficiency of the SCRF 34. The washcoat 40 can be applied such that there are variations in distribution across the substrate 42. Additionally, the washcoat 40 may become degraded as a result of thermal stress generated by the exhaust gas stream 16 such that the washcoat 40 begins losing the ability to retain the reductant 38 on the inner surface of the SCRF 34. Accordingly, as the washcoat 40 becomes degraded, the chemical reaction necessary to reduce NOx emissions cannot be sustained and the operating efficiency of the SCRF 34 decreases.

As the exhaust gas stream 16 passes through the SCRF 34, the particulate matter emitted from the engine 12 is collected in the SCRF 34. As such, for example, the SCRF 34 collects sooty particulate matter during a soot loading phase and disposes of the sooty particulate matter through the regeneration process. Generally, carbonaceous soot particulates can be oxidized during the regeneration process to produce gaseous carbon dioxide. The efficiency of the SCRF 34 can also be degraded due to the amount of soot accumulation on the SCRF 34, during the soot loading phase leading up to the regeneration process. In other words, the particulate matter can build on the inner surface of the SCRF 34, which can degrade the efficiency of the SCRF 34.

The exhaust gas aftertreatment system 20 may further include a first pressure sensor 44 and a second pressure sensor 46. The first pressure sensor 44 may be disposed at an inlet side 50 of the SCRF 34 between the SCRF 34 and the engine 12. The exhaust system 20 may further include a second pressure sensor 46 disposed at an outlet side 52 of the SCRF 34.

The first pressure sensor 44 may be configured to transmit a first pressure reading (arrow 54) to a differential pressure module 48, and the second sensor 46 may be configured to transmit a second pressure reading (arrow 56) to the differential pressure module 48.

The differential pressure module 48 may be in communication with the first pressure sensor 44 and the second pressure sensor 46. The differential pressure module 48 may be configured to determine the difference between the first pressure 54 reading and the second pressure reading 56 and generate a delta pressure signal (arrow 58) corresponding to a pressure drop across the SCRF 34 between the first pressure sensor 44 and the second pressure sensor 46.

Each of the first pressure sensor 44 and the second pressure sensor 46 may be a unitary sensor or gauge connected to the SCRF 34. The first and second pressure sensors 44, 46 may be embodied as a pair of pressure taps that individually read inlet and outlet pressures and calculate the differential pressure across the SCRF 34, as shown or alternatively as a signal sensor capable of returning a resultant $\Delta P$ measurement (arrow 58) to a controller 60.

The vehicle 10 may further include a controller 60. The controller 60 may be a stand-alone unit, or be part of an electronic controller that regulates the operation of the engine 12. The controller 60 may be embodied as a host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 60 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 60 can include all software, hardware, memory, algorithms, connections, sensors, etc., necessary to monitor and control the exhaust gas aftertreatment treatment system 20 and the engine 12.

The controller 60 is in electrical communication with various components of the vehicle 10, such as the pressure sensors 44, 46, the differential pressure module 48, and the SCRF 34. The controller 60 may receive readings (arrow 58) from the differential pressure module 48 indicating the differential pressure across the SCRF 34. The controller 60 may also control the engine 12 and the regeneration cycle of the SCRF 34 based on the readings from the differential pressure module 48 and the first and second pressure sensors 44, 46 and various other sensed information.

The controller 60 may further include a soot prediction module 62 which receives the pressure sensor signals 58 from the differential pressure module 48 and determines the differential pressure across the SCRF 34. The soot prediction module 62 estimates soot loading of the SCRF 34 based on the differential pressure across the SCRF 34. When the estimated loading reaches a threshold and the exhaust flow rate is within a desired range, the regeneration process is initiated.

The SCRF 34 combines the capabilities of a traditional SCR device and a traditional particulate filter. This combination requires the application of the washcoat 40 to a close coupled particulate filter, and allows the exhaust gas aftertreatment system 20 to enable an earlier NOx conversion during the drive cycle of a vehicle 10. However, the addition of the washcoat 40 to the particulate filter adds an extra source of variation to the pressure drop response across the clean SCRF 34 calculated by the differential pressure module 48. This noise can drive an error in the soot prediction module 62, resulting in too frequent initiation of a regeneration event resulting in lower fuel economy, due to thin washcoat 40 distribution and/or too infrequent initiation of a regeneration event of the SCRF 34 due to thick washcoat 40 distribution.

The controller 60 may further includes an adaptation module 64 configured to execute the present method 100 to adapt a clean filter correction map 70 of the SCRF 34. The adaptation module 64 may be written on a tangible, non-transitory memory device 68 of the controller 60. The adaption module 64 allows for an adaptation to the clean filter correction map 70 to adapt for such variations in washcoat 40 distribution on and within the substrate 42 of the SCRF 34, variations in properties of the pressure sensors 44, 46, and various effects due to ash accumulation, which allows for a more accurate threshold for the initiation of a regeneration event in the soot prediction module 62, via the present control method 100.

Figures 2, 3:
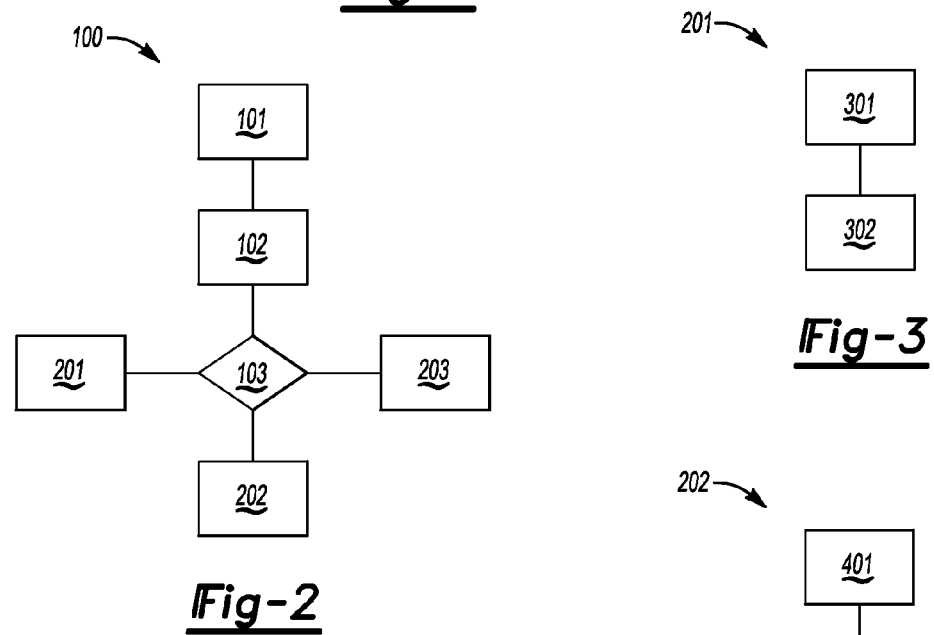
FIG. 2 is a flow diagram describing an example method of adapting the clean filter correction map for an SCRF.
FIG. 3 is a flow diagram detailing a first control action.

As shown in FIG. 2, the present method 100 of adapting the clean filter correction map 70 for an SCRF 34 may include three steps. At step 101, the controller 60 will first determine the number of completed regeneration events for the SCRF 34.

As one of ordinary skill in the art will appreciate, conventional particulate filters and the SCRF 34 described herein, are manufactured in such a way that following the application of the washcoat 40, a burn-off of the excess residue is required. The process of burning off the residue (ensuring the SCRF 34 is clean), through the process of a successive number of regeneration events, is called de-greening. At step 102, the controller 60 will compare the number of completed regeneration events to an evaluation element 72. The evaluation element 72 is a predetermined, calibrated, discrete number of regeneration events, which is deemed adequate to complete the de-greening process for the SCRF 34. The number of completed regeneration events deemed adequate to complete the de-greening process for the SCRF 34 may range from about two to about ten.

At step 103, the controller 60 will enable the adaptation module 64 by executing one of a first control action 201, second control action 202, and third control action 203. The controller 60 will execute the first control action 201, when the number of completed regeneration events is less than the evaluation element 72, i.e. wherein the de-greening process is not yet complete. The controller 60 will execute a second control action 202, when the number of completed regeneration events is equal to the evaluation element 72, i.e. when the de-greening process is completed and the adaptation of the clean filter correction map 70 is suitable for adaption. The controller 60, will execute a third control action 203, when the number of completed regeneration events is greater than the evaluation element 72, i.e. wherein the clean filter correction map 70 has already been adapted for the useful life of the SCRF 34, as the clean filter correction map 70 is only to be adapted once over the life of the SCRF 34 immediately following the de-greening process.

The first control action 201 is further detailed in FIG. 3. The first control action 201 is executed when the number of completed regeneration events is less than the evaluation element 72, i.e. wherein the de-greening process is not yet complete. The first control action 201 includes two steps 301, 302. At step 301, the controller 60 continuously compares the number of completed regeneration events with the evaluation element 72 until the number of completed regeneration events is equal to the evaluation element 72. Essentially, the controller 60, at step 301, effectuates a looping comparison of the number of regeneration events and the evaluation element 72 throughout the de-greening process, until the de-greening process is complete. When the number of regeneration events is equal to the evaluation element 72, signaling that the de-greening process is complete, the controller 60 initiates the second control action 202, at step 302.

Figures 4, 5:
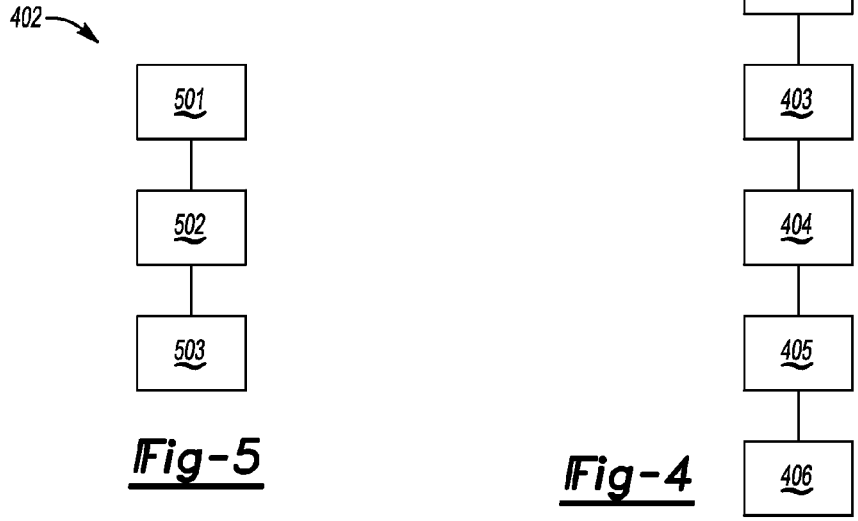
FIG. 4 is a flow diagram detailing a second control action.
FIG. 5 is a flow diagram detailing the method step of monitoring the exhaust gas pressure drop across the SCRF.

The second control action 202 is further detailed in FIG. 4. The second control action 202 may include six steps 401, 402, 403, 404, 405, 406. At step 401, the controller intrusively extends the amount of time allotted to complete an adapted regeneration event. An adapted regeneration event is a single regeneration event that takes place once during the life of the SCRF 34, when the second control action 202 is initiated following the de-greening process. The adapted regeneration event is a regeneration event in which the amount of burn-off time is intrusively extended by a first duration, wherein the first duration is a predetermined, calibrated, amount of time calibrated to ensure the SCRF 34 is fully cleaned for purposes of adapting the clean filter correction map 70.

At step 402, the differential pressure module 48 monitors the exhaust gas pressure drop across the SCRF 34. Step 402 is further detailed in FIG. 5. Monitoring the exhaust gas pressure drop across the SCRF 34 includes three steps 501, 502, 503. At step 501, the controller 60 obtains a first pressure reading 54 from the first pressure sensor 44 disposed at an inlet side 50 of the SCRF 34 between the SCRF 34 and the engine 12. At step 502, the controller 60 obtains a second pressure reading 56 from a second pressure sensor 46 disposed at an outlet side 52 of the SCRF 34. At step 503, the controller 60 via the delta pressure module 48, determines the differential pressure ($\Delta P$) across the SCRF 34, i.e. the difference between the first pressure reading 54 and the second pressure reading 56. Further, at step 503, the delta pressure module 48 generates a delta pressure signal 58 corresponding to the pressure drop between the first pressure sensor 44 and the second pressure sensor 46.

At step 403 of the second control action 202, the controller 60 collects a first set of instantaneous clean filter differential pressure readings 74 from the differential pressure module 48 via the delta pressure signal 58 following the adapted regeneration event.

At step 404, the controller 60 determines a clean filter correction factor 80 by comparing a first set of instantaneous clean filter delta pressure readings 74 with a second set of predetermined, calibrated values 76 stored in the clean filter correction map 70.

At step 405, the controller 60 applies the clean filter correction factor 80 to the clean filter correction map 70 to generate an adapted clean filter correction map 78 by multiplying each of the second set of predetermined, calibrated values 76 stored in the clean filter correction map 70 by the determined clean filter correction factor 80. The adapted clean filter correction map 78 is a two dimensional table defined by SCRF 34 temperature and volume flow rate.

The adapted clean filter correction map 78 accounts for variations in washcoat 40 distribution on and within the substrate 42, as the addition of the washcoat 40 to the SCRF 34 combined selective catalytic reduction device and particulate filter adds an extra source of noise to the pressure drop response across the clean SCRF 34, calculated by the differential pressure module 48. The use of the present method 100 and the adapted clean filter correction map 78 reduces the added inconsistency and accounts for such variation in pressure drop, allowing the soot prediction module 62 to adequately estimate the amount of soot accumulated in the SCRF 34 and estimate appropriate time for regeneration event initiation. The adaption module 64 allows for an adaptation to the clean filter correction map 70 to adapt for such variations in washcoat 40 distribution on and within the substrate of the SCRF 34, variations in properties of the pressure sensors 44, 46, and various effects due to ash accumulation, which allows for a more accurate threshold for the initiation of a regeneration event in the soot prediction module 62, via the present control method 100.

At step, 406, the controller 60 stores the adapted clean filter correction map 78 as a set of recorded instructions on the tangible, non-transitory memory device of the controller 60.

Referring to FIG. 2, the third control action 203 includes disabling the adaptation module 64. The present method 100 of adapting a clean filter correction map 70 of the SCRF 34 is only run once over the useful life of the SCRF 34. Therefore, once the number of completed regeneration events is greater than the evaluation element 72, the adaption module 64 shall be disabled for the remainder of the life of the SCRF 34, as the clean filter correction map 70 will have been previously adapted via the second control action 202.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system comprising:
an engine that generates an exhaust stream during operation;
an exhaust gas aftertreatment system coupled to and in fluid communication with the engine, the exhaust gas aftertreatment system including a selective catalytic reduction filter configured to catalytically convert constituents in the exhaust stream into inert byproducts and to filter particulate matter from the exhaust stream;
a first pressure sensor disposed at an inlet side of the selective catalytic reduction filter between the selective catalytic reduction filter and the engine;
a second pressure sensor disposed at an outlet side of the selective catalytic reduction filter;
a differential pressure module in communication with the first pressure sensor and the second pressure sensor and configured to generate a delta pressure signal corresponding to an exhaust gas pressure drop between the first pressure sensor and the second pressure sensor; and
a controller in communication with each of the engine, the first pressure sensor, the second pressure sensor, the differential pressure module, and the selective catalytic reduction filter, the controller having a processor and a memory on which is recorded instructions, wherein executing the recorded instructions causes the processor to:
initiate a de-greening process of the selective catalytic reduction filter, wherein the de-greening process includes initiating a predetermined discrete number of regeneration events of the selective catalytic reduction filter, such that the predetermined discrete number of regeneration events is defined as an evaluation element;
determine a number of completed regeneration events of the selective catalytic reduction filter;
compare the number of completed regeneration events to the evaluation element; and
enable an adaptation module by executing a first control action when the number of completed regeneration events is less than the evaluation element, a second control action when the number of completed regeneration events is equal to the evaluation element, and a third control action when the number of completed regeneration events is greater than the evaluation element.

2. The system of claim 1 wherein the first control action includes:
repeatedly comparing, via the controller, the number of completed regeneration events to the evaluation element until the number of completed regeneration events is equal to the evaluation element; and
initiating the second control action when the number of completed regeneration events is equal to the evaluation element.

3. The system of claim 2 wherein the second control action includes:
signaling the exhaust gas aftertreatment system to complete an adapted regeneration event of the selective catalytic reduction filter, wherein the controller extends an amount of time allotted to complete a regeneration event of the selective catalytic reduction filter by a first duration;
monitoring, with the differential pressure module the exhaust gas pressure drop across the selective catalytic reduction filter between the fist pressure sensor and the second pressure sensor;
collecting a first set of instantaneous clean filter differential pressure readings with the differential pressure module during the adapted regeneration event and transmitting the fist set of instantaneous clean filter differential pressure readings to the controller with the differential pressure module;
determining, via the controller, a clean filter correction factor by comparing the first set of instantaneous clean filter differential pressure readings with a set of predetermined values stored in a clean filter correction map, wherein the clean filter correction map is a table of predetermined calibrated values stored on the memory of the controller;
applying, via the controller, the clean filter correction factor to the clean filter correction map to generate an adapted clean filter correction map, wherein applying the clean filter correction factor to the clean filter correction map includes multiplying each predetermined calibrated value stored in the clean filter correction map by the clean filter correction factor; and storing the adapted clean filter correction map on the memory of the controller.

4. The system of claim 3 wherein the third control action includes disabling the adaptation module.

5. The system of claim 3 wherein the first duration is a predetermined calibrated amount of time, written on memory of the controller.

6. The system of claim 3 wherein the adapted clean filter correction map is a two dimensional table defined by selective catalytic reduction filter temperature and volume flow rate.

7. The system of claim 3 wherein monitoring the exhaust gas pressure drop across the selective catalytic reduction filter includes:
obtaining a first pressure reading from the first pressure sensor;
obtaining a second pressure reading from the second pressure sensor; and
determining a difference between the first pressure reading and the second pressure reading, via the differential pressure module wherein the differential pressure module generates a delta pressure signal corresponding to the exhaust gas pressure drop between the first pressure sensor and the second pressure sensor.

8. The system of claim 3 wherein the memory of the controller includes electrically erasable programmable read-only memory, and wherein the adapted clean filter correction map is stored on the electrically erasable programmable read-only memory of the controller.

9. The system of claim 1 wherein the predetermined discrete number of regeneration events defining the evaluation element is from about 2 to about 10.

10. The system of claim 1 wherein initiating one of the predetermined discrete number of regeneration events of the selective catalytic reduction filter during the de-greening process includes:
repeatedly monitoring, via the differential pressure module, the exhaust gas pressure drop across the selective catalytic reduction filter between the fist pressure sensor and the second pressure sensor and generating the delta pressure signal corresponding to the exhaust gas pressure drop between the first pressure sensor and the second pressure sensor with the differential pressure module;
transmitting the delta pressure signal with the differential pressure module to a soot prediction module written on the memory of the controller;
estimating, via the soot prediction module, an instantaneous soot loading value of the selective catalytic reduction filter based on at least the delta pressure signal and the clean filter correction map;
comparing, via the soot prediction module, the estimated instantaneous soot loading value of the selective catalytic reduction filter to a predetermined calibrated threshold soot loading value; and
initiating, via the controller, a regeneration of the selective catalytic reduction filter when the estimated instantaneous soot loading value of the selective catalytic reduction filter exceeds the predetermined calibrated threshold soot loading value.

11. The system of claim 3 wherein after the adapted clean filter correction map is stored on the memory of the controller, a regeneration event of the selective catalytic reduction filter is initiated by the controller via the following steps:
repeatedly monitoring, via the differential pressure module, the exhaust gas pressure drop across the selective catalytic reduction filter between the first pressure sensor and the second pressure sensor and generating the delta pressure signal corresponding to the exhaust gas pressure drop between the first pressure sensor and the second pressure sensor with the differential pressure module;
transmitting the delta pressure signal with the differential pressure module to a soot prediction module written on the memory of the controller;
estimating, via the soot prediction module, an instantaneous soot loading value of the selective catalytic reduction filter based on at least the delta pressure signal and the adapted clean filter correction map;
comparing, via the soot prediction module, the estimated instantaneous soot loading value of the selective catalytic reduction filter to a predetermined calibrated threshold soot loading value; and
initiating, via the controller, a regeneration of the selective catalytic reduction filter when the estimated instantaneous soot loading value of the selective catalytic reduction filter exceeds the predetermined calibrated threshold soot loading value.

* * * * *